United States Patent [19]
Krulee

[11] 3,777,569
[45] Dec. 11, 1973

[54] COMBINED CHARGING AND PRESSURE INDICATING DEVICE

[75] Inventor: Alfred W. Krulee, Chatham, N.J.

[73] Assignee: Norris Industries, Inc., Los Angeles, Calif.

[22] Filed: June 21, 1972

[21] Appl. No.: 264,776

[52] U.S. Cl. .................. 73/389, 73/418, 137/227
[51] Int. Cl. ................................................ G01l 19/00
[58] Field of Search ............... 73/146.3, 146.8, 73/389, 411, 418; 137/227

[56] References Cited
UNITED STATES PATENTS

| | | | |
|---|---|---|---|
| 1,893,222 | 1/1933 | Bronson | 73/146.8 |
| 1,061,472 | 5/1913 | Hackley | 73/146.8 |
| 3,380,427 | 4/1968 | Rubin | 73/146.8 |

Primary Examiner—Donald O. Woodiel
Attorney—Edward T. Connors

[57] ABSTRACT

A pressure gage has a charging inlet positioned in the center of the dial of the gage, in addition, the closure for the charging inlet is used for releasably making the pressure gage watertight.

2 Claims, 3 Drawing Figures

PATENTED DEC 11 1973 3,777,569

COMBINED CHARGING AND PRESSURE INDICATING DEVICE

The present invention relates to a combined charging and pressure indicating device particularly suitable for use on portable fire extinguishers utilizing dry powder as the fire extinguishing medium, although the combined charging and pressure indicating device is also used in fire extinguishing liquids or gaseous fire extinguishing media.

Heretofore it has been customary, as in the case of portable fire extinguishers, to provide a valve member in which the pressure gage has been mounted on one side of the valve and the charging fitting has been positioned on the opposite side thereof or at a separate location.

In the early fire extinguishers the pressure gage was of the pressure tube or so-called Bourdon type with a gear arrangement positioned between the tube and the pointer. More recently, in less expensive constructions, the gearing is omitted from the gages and the pressure tubes are made with a plurality of turns with pointers at the free ends thereof. It was easy with the early gages to ascertain whether or not the pointer was sticking by tapping the gage, and because of the high gear ratio between the pressure tube and the pointer, the pointer would vibrate. In the later gages which omit the gear ratio there is no significant movement of the pointer when the gage is tapped.

Safety regulations, in some cases, require that fire extinguishers be inspected monthly. Of course, while the gage may show that there is ample pressure in the extinguisher, the gage may have become stuck and be indicating pressure while in fact the pressure may have dropped below that required to expel the fire extinguishing agent in a satisfactory manner. Therefore it is necessary periodically to check the accuracy of the gage reading.

The combined charging and pressure indicating device in accordance with the invention overcomes a difficulty had with prior constructions in that in accordance with the invention the charging opening is positioned in the center of the dial of the pressure gage so that it is readily available for connection to a separate testing gage or to a pressure source. In addition the usual inlet valve of the charging opening may be used to relieve the pressure safely in the event it is desired to disassemble the extinguisher.

In the manufacture of dry chemical fire extinguishers on a production basis it is extremely important that any potential leaks be detected in a fast and economical manner. This testing is usually done by incorporating with the pressurizing gas a small amount of a trace agent such as a halogen, or helium. Thus if there is any leakage of the pressurizing gas it may be readily detected by a halogen leak detector or by the use of a mass spectrometer. The use of these test instruments is complicated somewhat by a regulation which requires that the pressure gage be watertight as many of the fire extinguishers are destined for marine use. This makes it difficult to test the gage itself for small leaks, thus to effectively test the completed extinguisher with its pressure gage in place it has been the practice, in some cases, to perforate the case or crystal of the pressure gage with a small hole so as to detect any leak from within the gage. It is necessary thereafter to seal the small hole to restore the water tightness of the pressure gage.

The construction in accordance with the invention lends itself to providing means for opening the interior of the pressure gage for leak tests and for closing it immediately thereafter. This closure means is achieved by a seal closed by the cap for the valve of the charging means.

The device in accordance with the invention thus includes a charging inlet positioned in the center of the dial of the gage, the closing means for the charging inlet releasably making the pressure gage interior watertight.

Figure 1:
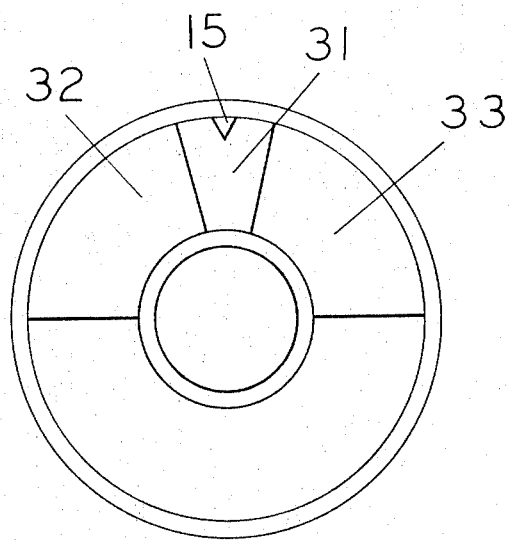
FIG. 1 is a front view of a combined charging and pressure indicating device in accordance with the invention.
Figure 2:
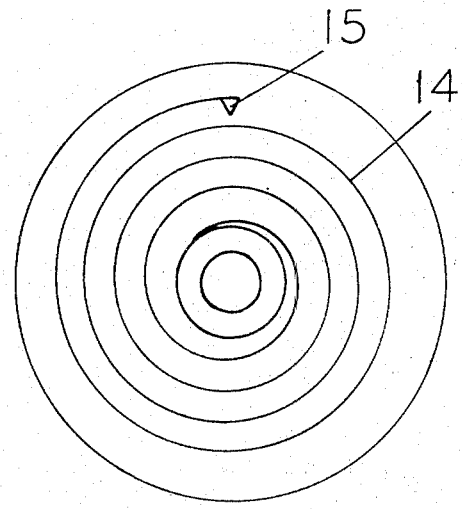
FIG. 2 is a view corresponding to FIG. 1 with the dial removed showing the construction of the pressure tube with a pointer.
Figure 3:
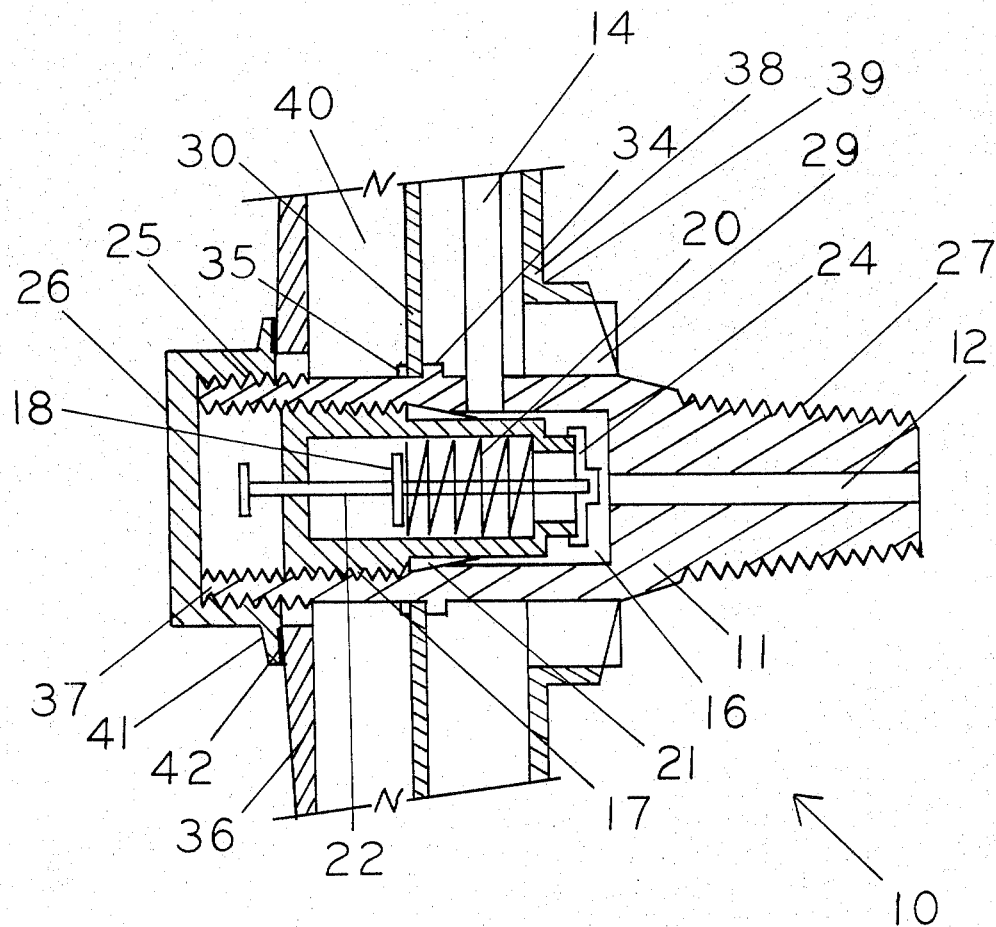
FIG. 3 is a sectional view of the combined charging and pressure indicating device at an enlarged scale.

Referring to the drawings there is shown a combined charging and pressure indicating device 10 in accordance with the invention comprising a supporting body member 11 having a fluid passage 12 extending therethrough. In fluid communication with an increased diameter portion 16 of the fluid passage 12 is a pressure tube 14 carrying an indicating pointer 15 at its outer end. Alternatively, as is known in the art, the pointer 15 may be connected to the pressure tube by a gear mechanism not shown. The fluid passage means 12 is provided with a threaded area 17 to receive an inlet type valve assembly 18 which includes, as is well known in the art, a spring 20, sealing means 21, a threaded outer surface to engage the threaded surface 17, and a valve stem 22 adapted to unseat valve member 24 against the action of the spring 20. The outer end of the supporting body 11 may be threaded as indicated at 25 to receive a cap member 26 having a threaded interior surface, or the cap member may be otherwise attached for example as by a snap fastening (not shown). The end of the supporting body member 11 about the fluid passage 12 is shown as provided with a tapered threaded surface 27 for securing the gage device in position in the wall of a pressure vessel or in the wall of a valve. Alternatively other means may be used for securing the gage device in position. An enlarged portion 29 of the supporting body 11 may have a surface shaped to receive a wrench or other tool for tightening the device in position in use.

A dial 30 is carried by the supporting body 11 and is provided with indicia as indicated in FIG. 1 showing an operable pressure range in the area 31, while if the pointer were in the area 32 it would indicate that the extinguisher should be recharged. If the pointer were in the area 33 an indication would be given that the pressure vessel was overcharged.

The dial 30 is carried against a shoulder 34 and may be held in place by a lock ring 35 or by other suitable construction. The dial 30 is protected by a transparent face 36 which is suitably apertured to receive charging end 37 of the supporting body 11. The gage has a case 38 swaged or otherwise attached to the enlarged portion 29 as indicated at 39. The case 38 has a cover member 40 holding the transparent face 34 in a watertight manner. The cap member 26 may have a knurled outer surface to facilitate its removal and it may have a flange 41 engaging a gasket 42 so that the body of the pressure gage may be releasably sealed. The cap member 26 may be removed or loosened so that a leak tester may explore the gage for leaks therein after which the cap member 26 is screwed into position restoring the watertightness of the case. In some instances it may be preferable to seal the transparent member 36 to the charging end 37 of the supporting body 11.

While the invention has been described and illustrated with reference to a specific embodiment thereof it is to be understood that other embodiments may be resorted to without departing from the invention. Therefore, the form of the invention set out above should be considered as illustrative and not as limiting the scope of the following claims.

I claim:

1. A combined charging and pressure indicating device of the type including a supporting body having a fluid passage therethrough, fluid pressure responsive means carried by said supporting body in fluid communication with said fluid passage, pressure indicating means for said fluid pressure responsive means, charging means carried by said supporting body in fluid communication with said fluid passage, whereby both charging fluid and fluid for pressure indication is passed through said fluid passage, said supporting body being an elongated member having a connecting end for engagement in an opening of a pressure vessel, said fluid passage in said supporting body extending in a straight line through the length of said body, an inlet valve member being positioned within said fluid passage, said fluid pressure responsive means being a pressure tube, said pressure indicating means incorporating a pointer movable by said fluid pressure responsive means, said pressure indicating means incorporating a dial, a casing incorporating a transparent viewing member being carried by said supporting member, said charging means extending through said transparent viewing member, the improvement wherein vent means is provided for said casing for possible leaks therein from said fluid passage means and/or said pressure tube, and a cap member is provided for said charging means, said cap member being adapted to provide a seal between said charging means and said transparent viewing member and to releasably seal said vent means.

2. A combined charging and pressure indicating device according to claim 1 in which said transparent viewing member is apertured at its center and is carried by said supporting member, said aperture being somewhat larger than said supporting member so as to provide said vent means.

* * * * *